Jan. 26, 1960  K. VOSSLOH  2,922,454
LOCK WASHER
Filed June 27, 1956

INVENTOR.
KARL VOSSLOH
BY Walter S. Bluston
ATTORNEY

United States Patent Office 2,922,454
Patented Jan. 26, 1960

2,922,454
LOCK WASHER

Karl Vossloh, Werdohl, Westfalia, Germany, assignor to Vossloh-Werke G.m.b.H., Werdohl, Westfalia, Germany, a limited liability corporation of Germany Application June 27, 1956, Serial No. 594,175

Claims priority, application Germany February 12, 1952

2 Claims. (Cl. 151—38)

The invention relates to a lock washer of the type disclosed in my co-pending application for U.S. patent Serial No. 336,086 filed February 10, 1953 and now abandoned of which the present is a continuation in part.

The invention aims to provide a split and arched lock ring washer having a longer spring movement than prevailing in conventional spring rings of a similar kind.

Another object of the invention is the provision of a spring ring washer which can be readily manufactured by pressing without a waste of material.

The invention further aims to provide a split lock washer having one supporting surface destined to bear on a stationary member and an opposite surface destined to be engaged by a nut, and being symmetrical with respect to an axial plane through the split of the washer.

The washer ring according to the invention is symmetrical with respect to a plane through the ring axis and said split, and is arched so that the pair of corners of the split and the diametrically opposite point of the supporting surface are on the same level and that the ring rises on each side from that opposite point to an apex, the two apices being spaced 200 to 220 degrees from each other, and falls away from these apices more steeply than it rises from said opposite point, the ring wire being so twisted that on the supporting surface the radii through the split edges and the opposite point slightly rise from the outer towards the inner periphery whereas on the nut engaging surface the radii through the apices are at right angles to the ring axis or inclined slightly downward from the outer to the inner periphery.

Figure 1:
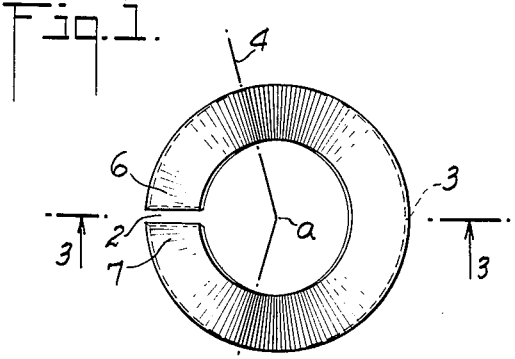
Figure 2:
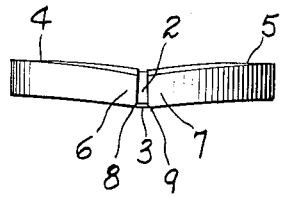
Figure 3:
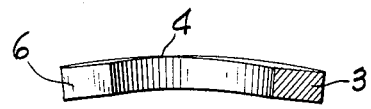
Figure 4:
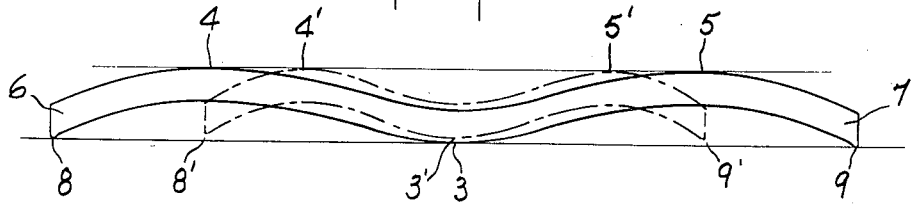
Figure 5:
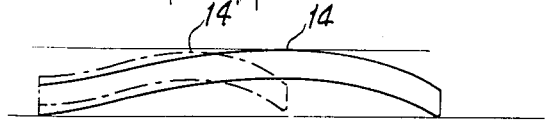

Further objects and details of the invention will be apparent from the description given hereinafter and the accompanying drawing illustrating an embodiment thereof by way of example. In the drawing Fig. 1 is a plan view of a washer ring seen from the side of the surface to be engaged by the nut, Fig. 2 is a side elevation thereof, Fig. 3 is a section along line 3—3 in Fig. 1, Fig. 4 is a diagram showing a development of the outer circumference of the washer in solid lines and a development of the inner circumference in dot and dash lines, and Fig. 5 is a similar development of half of a slightly modified washer.

Referring now to the drawing, the washer consists of a single coil of hardenable spring steel wire of substantially rectangular cross-section. It is split at 2 and so arched that it has, in the plan view of Fig. 1, a bottom point 3 diametrically opposite the split. The ring has a plane of symmetry defined by the axis a of the ring and the diameter 3—3 on which the section of Fig. 3 is taken. In order to obtain a span between the points to be engaged by a nut and thus a spring movement as long as possible, apices are located on the radii denoted by 4 and 5, respectively, and which are spaced from each other very considerably more than 180 degrees. I have found that the best results can be obtained if the spacing is between 200 and 220 degrees, of the washer periphery, the angle being 210 degrees in the illustrated embodiment. As clearly apparent from Figs. 1 and 4 the convex arches including the apices 4 and 5 are much larger than the concave or reversed arch including the bottom point 3. From each of the apices the ring falls away through about 75 degrees to the split more steeply than it rises from the bottom point. This fact limits the size of the angle between the apices because, if the angle exceeds 220 degrees, the steepness of the portions adjacent the split becomes too great for a satisfactory springing effect. The edges or only the outer corners 8 and 9 of the two ends 6 and 7, respectively, of the washer destined to bear on a supporting member are rounded off or the existence of any sharp corner may be prevented in any other conventional manner. Another feature provided for the purpose of increasing the length of the spring movement consists in that the ring wire is slightly twisted so that on the supporting surface of the ring the radii of the corners of the split edges and the radius of the bottom point rise slightly from the outer to the inner periphery so that the ring, when in use, will bear with three points of the outer periphery of its supporting surface on the supporting member. For the same reason, i.e. in order to increase the span, and thus the spring movement the radii on the nut-engaging surface are at right angles to the axis or even slightly inclined downward from the outer to the inner circumference. In consequence, the nut will bear on the washer with its outer periphery, so that the actual supporting points for the nut are spaced from each other as far as possible. On the other hand, the slight incline prevents any damage to the thread of the nut which otherwise may be caused by the inner rim of the hardened washer. The location of the bottom point 3 of the outer ring periphery in relation to the higher located point 3' on the same radius and on the inner periphery is clearly apparent in Fig. 4. Similarly, the lower location of the points 8 and 9 than that of the points 8' and 9' on the inner periphery, can be recognized. The same figure also shows the apex points 4 and 5 on the outer periphery and radially corresponding points 4' and 5' on the inner periphery all on the same level; whereas in Fig. 5 the apex denoted by 14 on the outer periphery is located on a slightly higher level than the radially corresponding point 14' on the inner periphery.

The longer spring movement than that prevailing in conventional washers has the advantage that even when the bearing surfaces of the split ring washer are greatly worn, a sufficiently strong locking effect can be obtained. Another advantage consists in the fact that the washer, when in use, will remain stationary with respect to the member on which it bears because the ends 8 and 9 on the outer washer periphery will press into and slightly indent the surface of that member whereby the washer will be secured against turning.

I claim:

1. A split lock washer consisting of a single coil of hardenable steel wire of substantially rectangular cross-section throughout and being symmetrical with respect to an axial plane through said split, the split ends being closely adjacent each other, said washer having a supporting surface and a nut engaging surface and, as seen from the side of the nut-engaging surface including a shorter concave portion opposite said split and two convex portions, each being larger than and adjoining said concave portion, said washer being arched so as to rise from a bottom point diametrically opposite and substantially on the same level as the split ends upwards to two apices on the opposite sides of said axial plane, respectively, and spaced from each other between 200 and 220 degrees, and to fall from said apices to the split ends of said coil more steeply than rising from said bottom point to said apices, the wire of said coil being so twisted that on the outer periphery of said supporting surface the corners of said split ends and said bottom point are located on a level lower than the radially corresponding points of the inner periphery, and that the outer peripheral points of said nut-engaging surface at said apices are located on the highest level of said coil, and said corners of said split ends being rounded off.

2. A washer as in claim 1, the radii through said apices on said nut engaging surface being slightly inclined from the outer periphery downward to the inner periphery of said coil.

References Cited in the file of this patent

UNITED STATES PATENTS

| | | |
|---|---|---|
| 1,065,149 | Loutrel | June 17, 1913 |
| 2,235,233 | McGrew | Mar. 18, 1941 |

FOREIGN PATENTS

| | | |
|---|---|---|
| 110,234 | Great Britain | Oct. 18, 1917 |
| 686,295 | Great Britain | Jan. 21, 1953 |